(12) United States Patent
Fukuju et al.

(10) Patent No.: US 6,671,375 B1
(45) Date of Patent: Dec. 30, 2003

(54) TELEPHONE CIRCUIT

(75) Inventors: Takeshi Fukuju, Yokohama (JP);
Toshihiko Umeda, Chigasaki (JP);
Yoshiro Hasegawa, Kamakura (JP)

(73) Assignees: Hitachi, Ltd., Tokyo (JP); Hitachi Communication Systems, Inc., Kanagawa (JP)

( * ) Notice: Subject to any disclaimer, the term of this patent is extended or adjusted under 35 U.S.C. 154(b) by 695 days.

(21) Appl. No.: 09/610,661

(22) Filed: Jul. 5, 2000

(30) Foreign Application Priority Data

Jul. 5, 1999 (JP) .......................................... 11-189919

(51) Int. Cl.[7] ............................................... H04M 1/00
(52) U.S. Cl. .................... 379/599.01; 379/339
(58) Field of Search .................... 379/90.01, 399.01, 379/339

(56) References Cited

U.S. PATENT DOCUMENTS

| | | | | |
|---|---|---|---|---|
| 4,759,059 A | * | 7/1988 | Christensen | 379/161 |
| 5,051,983 A | * | 9/1991 | Kammerl | 370/60 |
| 5,305,377 A | * | 4/1994 | D'Aroy et al. | 379/399.02 |
| 5,530,894 A | * | 6/1996 | Farrell et al. | 395/800 |
| 5,699,419 A | * | 12/1997 | Ardon | 379/156 |
| 6,208,637 B1 | * | 3/2001 | Eames | 370/352 |

FOREIGN PATENT DOCUMENTS

JP          06350696          12/1994

* cited by examiner

*Primary Examiner*—Creighton Smith
(74) *Attorney, Agent, or Firm*—Antonelli, Terry, Stout & Kraus, LLP

(57) ABSTRACT

Disclosed is a telephone circuit in which two simultaneously available telephones are connected by use of a pair of twisted-paired cables. A PBX 1 and a digital multi-function telephone 2 are connected by a pair of twisted-paired cables, a digital signal channel of 2B+D is established bidirectionally between the PBX 1 and the digital multi-function telephone 2, and user information and a control signal are sent and received therebetween. The digital multi-function telephone 2 and an analog telephone 3 are connected by a pair of twisted-paired cables, and a signal is sent and received between the digital multi-function telephone 2 and an analog telephone 3 by an analog signal of a voice band and a DC/AC control signal. A B1-channel on a 2-wire digital line 4 is allocated for user information transmission of the digital multi-function telephone 2, and a B2-channel is allocated for user information transmission of the analog telephone 3. A D-channel signal is shared by control signals of both the telephones. A bidirectional 2B+D digital signal is sent and received by a proper transmission system such as a ping-pong transmission system.

11 Claims, 13 Drawing Sheets

TELEPHONE CIRCUIT

BACKGROUND OF THE INVENTION

The present invention relates to a telephone circuit, more particularly to a telephone circuit for connecting two simultaneously available telephones using a pair of twisted-pair cables in a telephone exchange. The present invention relates to a telephone circuit which can set up two telephones in each guest room without any additional construction of a cable in a hotel in which only a pair of twisted-pair cables have been already appointed.

Recently, a case in which a portable personal computer is connected to a telephone in a guest room in a hotel and information is transferred has increased with prevalence of the portable personal computer. Furthermore, it has been desired that the telephone is available during transferring the information by the personal computer. When a plurality of conventional analog telephones are set up in the guest room of the hotel, a style in which two or three telephones are in parallel connected to an end terminal of the pair of twisted-pair cables connected to a telephone exchange, that is, a branch connection, has been generally adopted.

Such branch connection has inexpedience that when one telephone is in use, other telephones are not available. Moreover, vast amount of construction costs are needed when it is tried to additionally set-up telephones by incorporating more cables in each guest room.

As a prior art in which a transmission line of plural channels such as 2B+D is formed on a pair of twisted-pair cables and two digital telephones are connected thereto, there is Japanese Patent Laid-Open No. 5(1993)-350696. In the technique disclosed in the gazette, though the two telephones are simultaneously available, there is the following problem to be solved.

Specifically, in this prior art, a bipolar code of Alternate Mark Inversion (hereinafter referred to as AMI) is used for a line code, and pulses transmitted from the two telephones are multiplexed on the twisted-pair cables according to an AMI code rule. Accordingly, polarities of the pulses which one telephone transmits are monitored by the other telephones and codes of the pulses which one telephone transmits must be determined. Furthermore, as a case for connecting a telephone to an end terminal of the twisted-pair cable, there are the following two cases. One is that one telephone is connected to the end terminal of the twisted-pair cables. The other is that two telephones are connected thereto. Since impedance of the end terminal of the twisted-pair cables changes depending on the number of telephones connected to the end terminal of the twisted-pair cables, the following countermeasures are necessary. Specifically, transmission waveforms must be automatically adjusted while observing receipt waveforms or a detection level of the receipt waveforms must be automatically adjusted. Therefore, a pulse transmitter-receiver circuit is complicated.

Furthermore, when a conventional analog telephone is called up, a ringing signal of a high alternate voltage (e.g., 75 Vrms, 16 Hz) is used. A high alternate voltage generator for producing the ringing signal is necessary for an exchange connecting the telephone and equipment, which are set up on a base side. The reason why the high alternate voltage is used is that an electromagnetic bell was used in the conventional telephone. Accordingly, the conventional telephone adopts such style. However, telephones which have been recently manufactured are almost computerized. In such telephones, while a ringing signal is detected, a ring back tone for calling up a called-up person is generated by a tone ringer generating circuit using a low voltage. To be more specific, because it is necessary only that a signal indicating a call request is transmitted to a telephone from an exchange and equipment on a base side, the high alternate voltage generator is expensive and unnecessary.

SUMMARY OF THE INVENTION

In view of the drawbacks of the conventional telephone, the object of the present invention is to provide a telephone circuit economically which makes it possible to set up simultaneously available two telephones on a remote end terminal or an end portion of a cable by utilizing an existing pair of twisted-paired cables.

Another object of the present invention is to provide a telephone circuit which makes it possible to set up two simultaneously available telephones on a remote end terminal or an end portion by utilizing an existing pair of twisted-pair. cables connected to a telephone exchange, without any additional construction of a cable, and particularly which makes it possible to set up a plurality of telephones in a guest room of a hotel economically.

Still another object of the present invention is to economically realize a telephone circuit which transmits a ringing signal between first and second telephones by a polarity-reversal signal and makes it unnecessary to provide a high alternate voltage generating circuit that has been necessary, thus making it possible to set up a plurality of simultaneously available telephones on a remote end terminal of a cable or an end portion thereof.

A telephone circuit of the present invention comprises,
a first circuit connected to a telephone exchange by a pair of lines, the first circuit establishing first and second information channels and a signal channel bidirectionally between a telephone exchange and a first telephone, thus sending and receiving user information and a control signal; and
a second circuit connected to a second telephone by a pair of lines, which transmits/receives an analog signal of a voice band and a DC or AC control signal, and transmits/receives the second information channel and a control signal to/from the first circuit,
wherein the first circuit allocates to the first telephone the first information channel of the bidirectional channels between the telephone exchange and the first telephone, allocates the second information channel to the second telephone, and allocates a signal channel to the control signals of the first and second telephones.

To achieve the foregoing objects, the present invention has one feature in that a telephone exchange and a first telephone are connected by a pair of twisted-pair cables, or the telephone exchange and the first telephone are connected by a 2-wire digital line or an ISDN line (2B+D) by a point-to-point contact, a digital signal channel of the ISDN line (2B+D) is established bidirectionally between the telephone exchange and the first telephone, and performs reciprocation for user information and a control signal between the telephone exchange and the first telephone.

The present invention has another feature in that an interface circuit is provided for connecting a first telephone to a second analog telephone, and the first telephone and a second telephone are connected by a pair of twisted-pair cables (2-wire analog line), and an analog signal of a voice band and a DC/AC control signal are sent and received between the first and second telephones. In contrast, in a general ISDN basic interface, a plurality of ISDN terminals are connected to a 4-wire digital line (2B+D) via respective buses.

Furthermore, a detailed way to achieve the telephone circuit will be described as follows.

The B-channel of the foregoing 2B is allocated to the foregoing first telephone, and the other B-channel is allocated to the foregoing second telephone. The foregoing D-channel signal can be shared by control signals for the foregoing first and second telephones.

The bidirectional (2B+D) digital signal should be sent and received by a ping-pong transmission system. However, the transmission system is not limited to this, and an appropriate transmission system can be adopted.

It is possible to allow the foregoing first telephone to operate by supplying power from the foregoing telephone exchange thereto, the power being superposed on a signal on the pair of twisted-pair cables. It is possible to allow the foregoing second telephone to operate by supplying power from the foregoing first telephone thereto, the power being superposed on a signal on the pair of twisted-paired cables.

An on-hook/off-hook signal of the foregoing second telephone is transmitted by making and breaking a loop of the pair of twisted-paired cables, and the on-hook/off-hook signal can be transmitted to the foregoing telephone exchange after converting this signal to the foregoing D-channel control signal in the foregoing first telephone.

A dial signal (address signal) of the foregoing second telephone is transmitted by making and breaking a loop of the pair of twisted-paired cables, and the dial signal thereof is transmitted to the foregoing telephone exchange after converting this signal to the foregoing D-channel control signal in the foregoing first telephone. Alternatively, a DTMF signal is transmitted onto the pair of twisted-paired cables, and can be transmitted to the foregoing telephone exchange via the foregoing B-channel after converting this signal to a digital signal in the foregoing first telephone.

Transmission request information relating to a ringing signal for the foregoing second telephone is transmitted to the foregoing first telephone from the foregoing telephone exchange via the foregoing D-channel, and the transmission request information is converted to an AC bell-ringing signal in the foregoing first telephone based on the transmission request information. The AC bell-ringing signal is transmitted to the foregoing second telephone.

Transmission request information relating to a ringing signal for the foregoing second telephone is transmitted to the foregoing first telephone from the foregoing telephone exchange via the foregoing D-channel, and the transmission request information is transmitted to the foregoing second telephone by a polarity reversal signal of a voltage applied onto the pair of twisted-paired cables in the foregoing first telephone based on the transmission request information.

The foregoing second telephone generates ring back tone during a period of time when the polarity is inverted in response to the foregoing polarity-reversal signal from the foregoing first telephone.

A circuit for generating the ring back tone generated by the foregoing second telephone operates by current flow by the polarity-reversal signal from the foregoing first telephone, by utilizing a diode characteristic.

Transmission request information relating to a message waiting signal for the foregoing second telephone is transmitted to the foregoing first telephone from the foregoing telephone exchange via the foregoing D-channel, and a DC power source supplied from the foregoing telephone exchange via the pair of twisted-paired cables is converted in the foregoing first telephone based on the transmission request information to a message waiting signal which is to be transmitted to the foregoing second telephone. The message-waiting signal is transmitted to the foregoing second telephone.

Although the foregoing first telephone should mount circuits and parts necessary for connecting the foregoing first telephone thereto on its detachable baby board, the foregoing first telephone is not limited to such structure.

A signal sent and received on the foregoing D-channel is constituted by a packet. A packet for loading information relating to the foregoing first telephone to be sent and received and a packet for loading information relating to the foregoing second telephone to be sent and received are separately prepared, and a telephone identifier is provided in each packet, respectively, and both packets can be identified from each other.

The foregoing second circuit provides an alternation switch for switching a downstream signal of the second information channel to a speaker built in the foregoing first telephone, based on transmission instruction information from the telephone exchange to the speaker in the foregoing first telephone via the signal channel.

All or part of a power source for supplying power from a first telephone to a second telephone by superposing the power on a signal on a pair of lines, a power source for a message waiting signal, and a ringing power source are supplied with power from a power source or an external power source which are supplied with power from a telephone exchange to the first telephone by superposing the power on a signal on a pair of lines.

BRIEF DESCRIPTION OF THE DRAWINGS

For a more complete understanding of the present invention and the advantages thereof, reference is now made to the following description taken in conjunction with the accompanying drawings, in which.

DETAILED DESCRIPTION OF THE PREFERRED EMBODIMENTS

Figure 1:
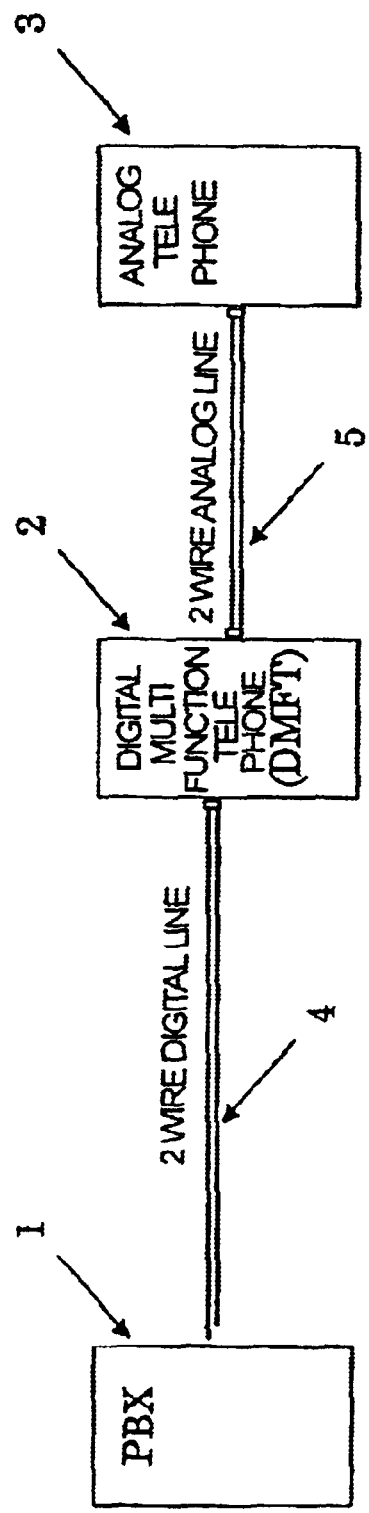
FIG. 1 is a schematic view showing a constitution of a system of the present invention.

Embodiments of the present invention will be described below. Note that the same reference numerals in drawings denote constituent components exhibiting functions essentially identical to each other.

In FIG. 1, a schematic constitution view of a system of the present invention is shown. This system comprises a PBX 1, a digital multi-function telephone (DMFT) 2 connected to the PBX 1, and an analog telephone 3 connected to the digital multi-function telephone 2. In such constitution, the PBX 1 and the digital multi-function telephone 2 are connected by a 2-wire digital line 4 using a pair of twisted-paired cables. A 2B+D digital signal channel is bidirectionally formed on the 2-wire digital line, and user information and a control signal are sent and received between the PBX 1 and the digital multi-function telephone 2 though a B-channel and a D-channel, respectively. The digital multi-function telephone 2 and the analog telephone 3 are connected by a 2-wire analog line 5 using a pair of twisted-paired cables, and on the 2-wire analog line 5, reciprocation between the digital multi-function telephone 2 and the analog telephone 3 is performed by an analog signal of a voice band and a DC/AC control signal.

A B1-channel of the 2B (B1-channel and B2-channel) on the 2-wire digital line 4 is allocated to user information transmission of the digital multi-function telephone 2, and a B2-channel thereof is allocated to user information transmission of the analog telephone 3. A signal on the D-channel is shared by control signals of both the telephones 2 and 3. The bidirectional 2B+D digital signal can be sent and received by a proper transmission system such as a ping-pong transmission system.

The digital multi-function telephone 2 is supplied with a DC power from the PBX1, which is superposed on a signal on the pair of twisted-paired cables, and thus operates. The analog telephone 3 is supplied with a DC power from the digital multi-function telephone 2, which is superposed on a signal on the pair of twisted-paired cables, and thus operates. The whole or a part of the circuit of digital multi-function telephone 2 or the analog telephone 3 may be supplied with a power from other commercial power sources. The digital line 4 and the analog line 5, are not limited to 2-wires, and they can be constituted by four wires or wires of the appropriate number.

First, a first embodiment of the digital multi-function telephone and the analog telephone of the present invention will be described.

Figure 2:
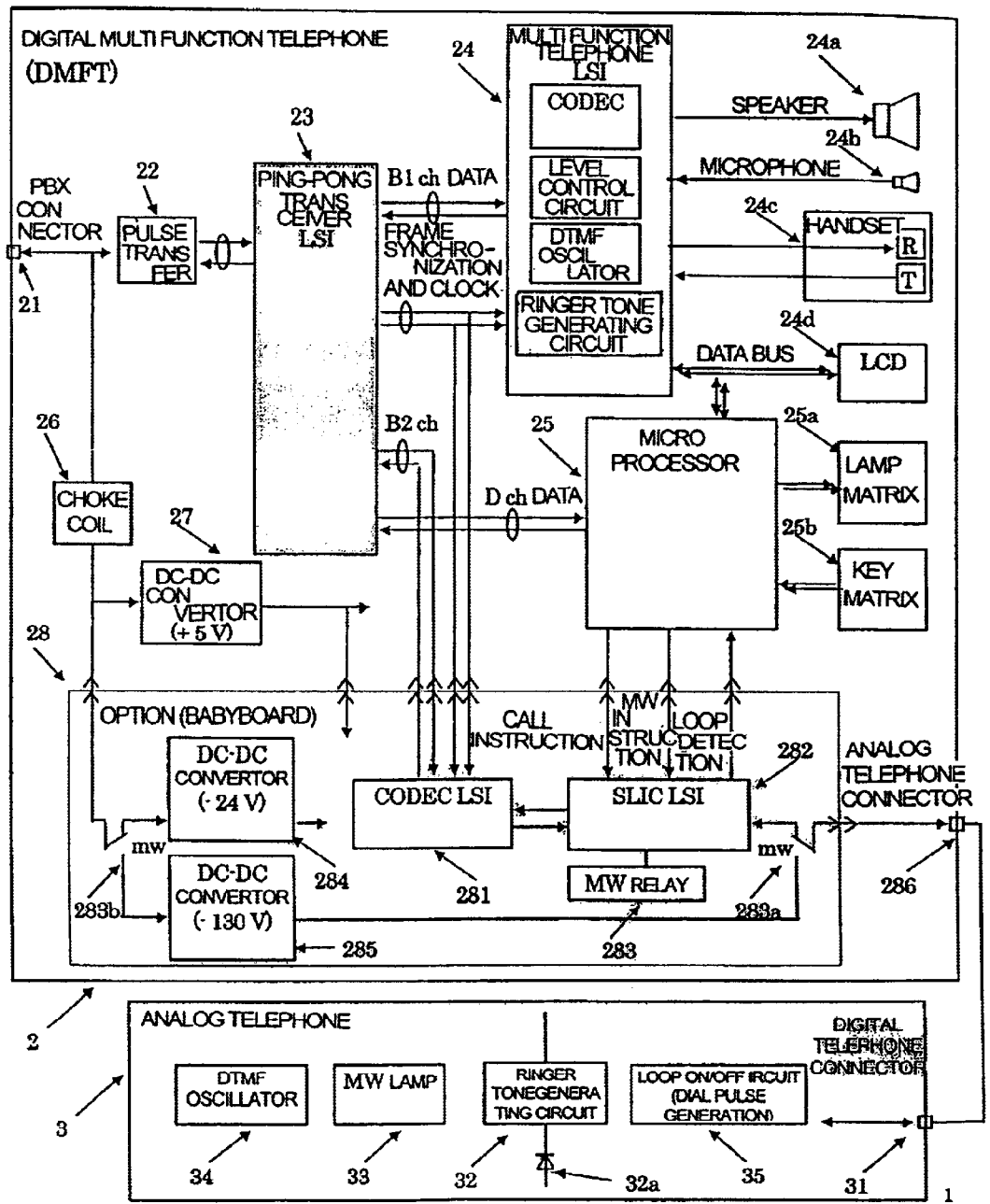
FIG. 2 is a diagram showing a constitution of a first embodiment of a digital multi-function telephone and an analog telephone of the present invention.

In FIG. 2, a constitution of the first embodiment of the digital multi-function telephone and the analog telephone of the present invention is shown.

The digital multi-function telephone 2 comprises a PBX connector 21 for connecting the PBX 1 and the 2-wire digital line 4; a pulse transformer 22 for sending and receiving a digital signal between itself and the PBX 1 and removing line noises; a ping-pong transceiver LSI 23 for sending and receiving the digital signal between itself and the PBX 1 by the pong-pong transmission system (lime Compression Multiplex system) and multiplexing and separating B-1 channel, B-2 channel and D-channel; a multi-function telephone LSI 24 incorporating various kinds of functions required for a general digital multi-function telephone; a speaker 24a used for hand free telephone conversation; a microphone 24b used for the hand free conversation; a hand set 24c used for a general telephone conversation; a display section 24d such as LCDs for displaying dialed phone number of the other party and a display concerning handling of the telephone; a microprocessor 25 for sending and receiving a message between itself and the PBX 1 and controlling circuits installed in the telephone; a lamp matrix 25a constituted by a plurality of lamps for performing a various kinds of displays for the user; a key matrix 25b constituted by various kinds of keys operated by the user; a choke coil 26 for allowing DC components to pass therethrough as high impedance against AC components (digital signal); a DC-DC converter 27 for producing a voltage necessary for the circuits installed in the telephone; an option baby board 28 loading a circuit required when the analog telephone 3 is connected; and an analog telephone connector 286 for connecting the 2-wire analog line 5 to the analog telephone 3. The multi-function telephone LSI 24 comprises, for example, a CODEC, a level controlling circuit, a DTMF oscillator, a ringer tone generating, circuit and the like.

The option baby board 28 comprises a CODEC LSI 281 for converting an analog signal of a voice band and a PCM signal to the other interchangeably; a SLIC LSI (subscriber line interface LSI) 282 incorporating a basic interface function with the telephone, a message waiting signal controlling relay (MW relay) 283 for controlling a message waiting signal to be transmitted to the analog telephone 3, first and second contacts 283a and 283b of the message waiting signal controlling relay 283, an analog telephone power supply DC-DC converter 284 for supplying a current to the analog telephone 3, and a message waiting signal DC-DC converter 285 for generating a DC message waiting signal.

The analog telephone 3 comprises a digital telephone connector 31 for connecting the digital multi-function telephone 2 to the 2-wire analog line 5, a ringer tone generating circuit 32 for generating a ring back tone, a diode 32a provided in an input of the ringer tone generating circuit 32 so as to allow a current to flow therethrough when a polarity of a DC power source supplied from the above described digital telephone is inverted, a message waiting lamp 33 turned on upon receipt of the message waiting signal, a DTMF oscillator 34 for generating a two-frequency synthesis signal corresponding to a dial key number entered by the user, and a loop open-close, circuit 35 for making and breaking a loop of the 2-wire analog line 5 and transmitting on/off hook information. As described later, the loop open-close circuit 35 may comprise a function for generating dial pulses if necessity arises. The analog telephone 3 is connected to the digital telephone 2 through the digital telephone connector 31 and the analog telephone connector 286.

Figure 3:
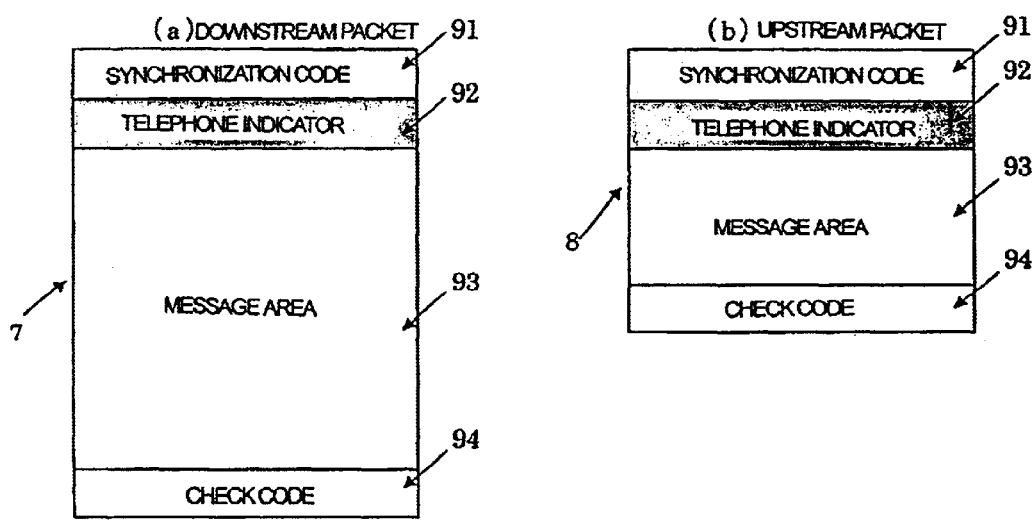
FIGS. 3(a) and 3(b) are explanatory views of a format of a D-channel signal packet.

An explanatory view of a format of a D-channel signal packet is shown in FIGS. 3(a) and 3(b). FIG. 3(a) shows an example of a format 7 of a downstream packet for transferring information from the PBX 1 to the digital multi-function telephone 2, and FIG. 3(b) shows an example of a format 8 of an upstream packet for transferring information from the digital multi-function telephone 2 to the PBX 1.

As shown in FIG. 3(a), the downstream packet 7 comprises a synchronous code 91 for identifying a head of the packet, a telephone identifier 92 for identifying an address telephone, a message area 93 for storing information to be transferred, and a check code 94 for detecting an error during a transfer of the packet. As shown in FIG. 3(b), the upstream packet 8 comprises a synchronous code 91 for identifying a head of the packet, a telephone identifier 92 for identifying a transmission origin telephone, a message area 93 for storing information to be transmitted, and a check code 94 for detecting an error during a transfer of the packet.

Figure 4:
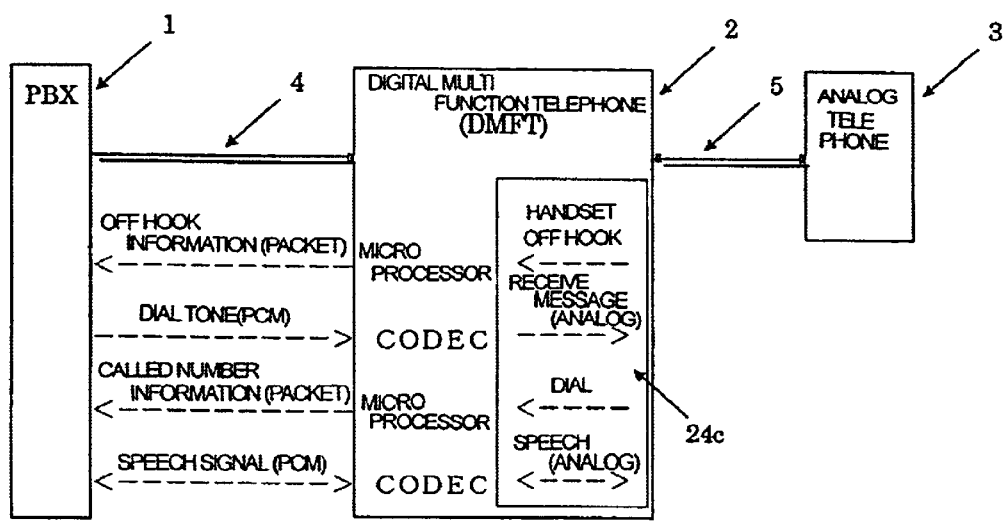
FIG. 4 is an explanatory view for explaining a signal transmission operation from the digital multi-function telephone.

An explanatory view for explaining a signal transmission operation from the digital multi-function telephone is shown in FIG. 4. FIG. 4 shows a flow of a signal in the case where the user (calling subscriber) makes a transmission from the digital multi-function telephone 2 and talks to a called person through the PBX1.

When the user raises the hand set 24c of the digital multi-function telephone 2, a hook switch (not shown) operates, and the, operation of the hook switch is detected by the micro processor 25. Thus, it is recognized that the digital multi-function telephone 2 made a calling (and set off-hook). The microprocessor 25 stores an off-hook information from the digital multi-function telephone 2 in the message area 93 of the upstream packet 8, and composes the upstream packet 8 to which the telephone identifier 92 indicating that the transmission origin is the digital multi-function telephone 2 is attached. The microprocessor 25 transmits the upstream packet 8 to the PBX 1 via the upstream D-channel of the 2-wire digital line 4 (off-hook information (packet)). Here, the ping-pong transceiver LSI 23 multiplexes the upstream D-channel with an upstream B1 and B2-channels, and transmits them.

The PBX 1 receives off-hook information by the upstream packet 8, and transmits dial tone to the downstream B-channel of the 2-wire digital line 4 (dial tone (PCM)). The dial tone is transmitted to the hand set 24c via the 2-wire digital line 4, the PBX connector 21, the pulse transformer 22, the ping-pong transceiver LSI 23 and the multi-function telephone LSI 24. The user can listen to this dial tone (telephone receiving (analog)). Since the dial tone of a PCM signal transmitted from the PBX 1 is loaded on the downstream B1-channel and transmitted, and converted to an analog signal by the CODEC in the multi-function telephone LSI 24 after separating only a signal on the downstream B1-channel by the ping-pong transceiver LSI 23 therefrom.

When the user listens to the dial tone and enters a telephone number of the called person from a dial pad included in the key matrix 25b of the digital multi-function telephone 2, the telephone number of the called person corresponding to a dial key number entered by the user is recognized by the microprocessor 25 (dial). The microprocessor 25 stores telephone number information of the called person in the message area 93 of the upstream packet 8, and composes the upstream packet 8 to which the telephone identifier 92 indicating that the transmission origin is the digital multi-function telephone 2 is attached. The microprocessor 25 transmits the upstream packet 8 to the PBX 1 via the upstream D-channel (called person number information (packet)).

Thus, in the PBX 1, the telephone number of the called person can be recognized by receiving the upstream packet 8 from the upstream D-channel. The PBX 1 performs processing in which the upstream and downstream B1-channels of the 2-wire digital line 4 is exchangeably connected to the called person line connected to the PBX 1 by a general exchange processing, and thus a talking path is established between the user and the called person. The downstream talking signal between the user and the called person is transmitted to the hand set 24c via the same talking path as that of the above described dial tone, and with reference to the upstream talking signal, an analog signal from the hand set 24c is converted to a PCM signal by the CODEC in the multi-function telephone LSI 24. The PCM signal is multiplexed in the ping-pong transceiver LSI 23 as the upstream B1-channel signal with the upstream B2 and D-channels and transmitted (talking signal (PC)), talking (analog)).

Figure 5:
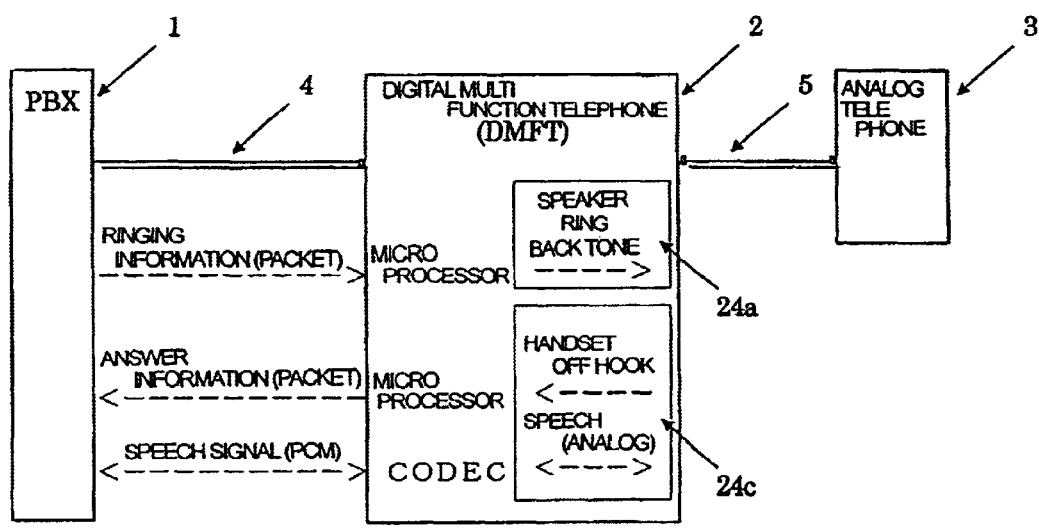
FIG. 5 is an explanatory view for explaining a signal receiving operation to the digital multi-function telephone.

An explanatory view of for explaining an incoming operation to the digital multi-function telephone is shown in FIG. 5. In FIG. 5, the flow in the case where the user (called person) of the digital multi-function telephone 2 is called for from the PBX 1 side and the user talks to the calling subscriber via the PBX 1 is shown.

When it is recognized that the called person is the digital multi-function telephone 2, the PBX 1 stores ringing signal information in the message area 93 of the downstream packet 7, and composes the downstream packet 7 to which the telephone identifier 92 indicating that contents of the downstream packet 7 are addressed to the digital multi-function telephone 2 is attached. The PBX 1 transmits the downstream packet 7 to the digital multi-function telephone 2 via the downstream D-channel of the 2-wire digital line 4 (ringing information (packet)). The downstream packet 7 loading the ringing signal information to be transmitted to the digital multi-function telephone 2 is transferred to the microprocessor 25 after separating only a signal on the downstream B1-channel by the ping-pong transceiver LSI 23 therefrom. The microprocessor 25 which recognized the transfer of the downstream packet 7 thereto controls the ringer tone generating circuit in the multi-function telephone LSI 24, and generates ring back tone. Thus, the user can be called (speaker, ring back tone)

When the user raises the hand set 24c of the digital multi-function telephone 2, a hook switch (not shown) operates, and the operation of the hook switch is detected by the micro processor 25. Thus, it is recognized that the called person responded to the calling (hand set off-hook). The microprocessor 25 stores response information from the digital multi-function telephone 2 in the message area 93 of the upstream packet 8, and composes the upstream packet 8 to which the telephone identifier 92 indicating that the transmission origin is the analog telephone 3 is attached. The microprocessor 25 transmits the upstream packet 8 to the PBX 1 via the upstream D-channel of the 2-wire digital line 4 (response information (packet)).

The PBX 1 receives the response information by this packet, and performs processing in which the upstream and downstream B1-channels of the 2-wire digital line 4 is exchangeably connected to the called person line connected to the PBX 1 by a general exchange processing, and thus a talking path is established between the user and the called person. Any of the downstream and upstream talking signals between the user and the called person is transmitted between the digital multi-function telephone 2 and the PBX 1 via the same tang path as that of the above described originating connection from the digital multi-function telephone 2 (talking signal (PCM), talking (analog)).

Figure 6:
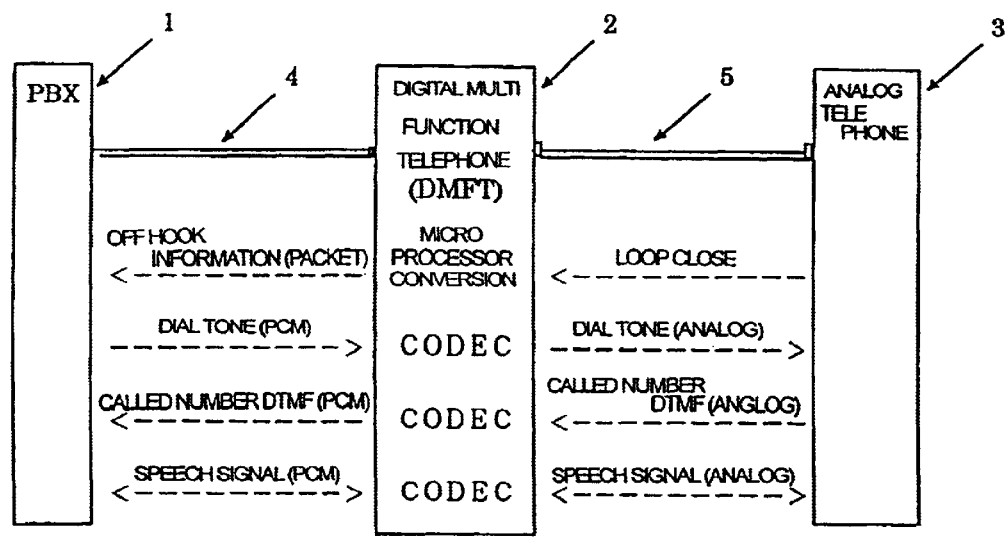
FIG. 6 is an explanatory view for explaining a signal transmission operation from the analog telephone.

An explanatory view for explaining a signal transmission operation from the analog telephone is shown in FIG. 6. In FIG. 6, a flow in the case where the user (calling subscriber) makes a transmission from the analog telephone 3 and the user talks to the called person via the digital multi-function telephone 2 and the PBX 1 is shown.

When the user raises the handset of the analog telephone 3, the loop open-close circuit 35 operates, and a signal indicating that the loop is closed is transmitted to the 2-wire analog line 5. This signal is loop-detected by the microprocessor 25 after passing through the SLC LSI 282, and it is recognized that the signal is a calling from the analog telephone 3 (loop close). The microprocessor 25 stores off-hook information from the analog telephone 3 in the message area 93 of the upstream packet 8, and composes the upstream packet 8 to which the telephone identifier 92 indicating that the transmission origin is the analog telephone 3 is attached. The microprocessor 25 transmits the upstream packet 8 to the PBX 1 via the upstream D-channel of the 2-wire digital line 4 (off-hook information (packet)).

The PBX 1 receives off-hook information by the upstream packet 8, and transmits dial tone to the downstream B2-channel of the 2-wire digital line 4. The PBX 1 connects the DTMF signal receiver to the upstream B2-channel of the 2-wire digital line 4 (dial tone (PCM)). The dial tone is sent to the analog telephone 3 via the 2-wire digital line 4, the PBX connector 21, the pulse transformer 22, the ping-pong transceiver LSI 23, the CODEC LSI 281, the SLIC LSI 282, the analog telephone connector 286 and the 2-wire analog line 5, and the user can listen to the dial tone (dial tone (analog)). Since the dial tone of the PCM signal transmitted from the PBX 1 is loaded on the downstream B2-channel and transmitted, the dial tone of the PCM signal is converted to an analog signal by the CODEC LSI 281 after separating a signal of the downstream B2-channel by the ping-pong transceiver LSI 23.

When a user listens to the dial tone and enters the telephone number of the called person from the dial pad of the analog telephone 3, the DTMF signal is transmitted from the DTMF oscillator 34 to the PBX 1 via the 2-wire analog line 5, the analog telephone connector 286, the SLIC LSI 282, the CODEC LSI 281, the ping-pong transceiver LSI 23, the pulse transformer 22, the PBX connector 21 and the 2-wire digital line 4 (called person information DTMF (analog), called person information DTMF (PCM)). The analog DTMF signal is converted to the PCM signal by the CODEC LSI 281, loaded on the upstream B2-channel by the ping-pong transceiver LSI 23. Then, the analog DTMF signal is multiplexed upstream B1 and D-channel and transmitted.

In the PBX 1, the DTMF signal receiver previously connected to the upstream B2-channel receives the DTMF signal, and the telephone number of the called person can be recognized. The PBX 1 performs processing in which the upstream and downstream B2-channels of the 2-wire digital line 4 is exchangeably connected to the called person line connected to the PBX 1 by a general exchange processing, and thus a talking path is established between the user and the called person. The downstream and upstream talking signals between the user and the called person can be transmitted between the analog telephone 3 and the PBX 1 via the same talking path as those of the above described dial tone and the DTM signal. (talking signal (PCM), talking signal (analog)).

Figure 7:
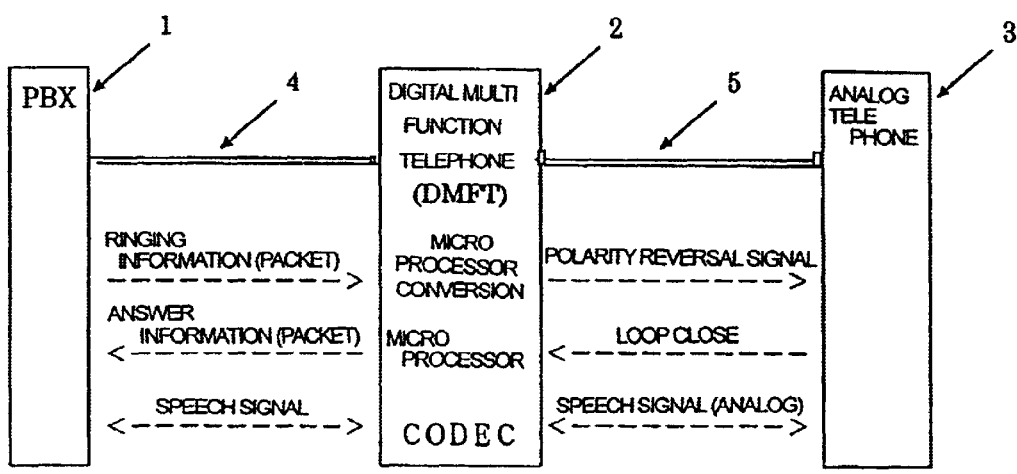
FIG. 7 is an explanatory view for explaining a signal receiving operation to the analog telephone.

An explanatory view for explaining a signal receiving operation to the analog telephone is shown in FIG. 7. In FIG. 7, a flow in the case where the calling subscriber on the PBX 1 side calls the called person of the analog telephone 3 and the calling subscriber talks to the called person via the PBX 1 and the digital multi-function telephone 2 is shown.

When the PBX 1 recognizes that the called person is the analog telephone 3, the PBX 1 stores the ringing signal information in the message area 93 of the downstream packet 7, and composes the downstream packet 7 to which the, telephone identifier 92 indicating that contents of the downstream packet 7 are addressed to the analog telephone 3 is attached. The PBX 1 transmits the downstream packet 7 to the digital multi-function telephone 2 via the downstream D-channel of the 2-wire digital line 4 (ringing information (packet)). The downstream packet 7 loading the ringing signal information to be transmitted to the analog telephone 3 is transferred to the microprocessor 25 after separating only the downstream D-channel signal by the ping-pong transceiver LSI 23. The microprocessor 25 that recognized the transfer of the downstream packet 7 thereto makes the ringing instruction to the SLIC LSI 282, and the SLIC LSI 282 inverts a polarity of the supply voltage applied to the analog telephone 3 via the 2-wire analog line 5 (supply voltage polarity-reversal signal). Thus, the diode 32a in the analog telephone 3 is turned on, and the ringer tone circuit 32 operates, thus generating ring back tone. At this time, the microprocessor 25 makes the ringing instruction to the SLIC LSI 282 at a previously determined cycle intermittently, and hence ringer tone which sounds for one minute and becomes silent for two minutes is produced. The user can be called up.

When the user raises the hand set of the analog telephone 3, a hook switch (not shown) operates, and hence the signal indicating that the loop is closed is sent out to the 2-wire analog line 5. This signal is detected by the microprocessor 25 via the SLIC LSI 282, and it is recognized that the called user responded (loop close). The microprocessor 25 stores response information (loop close) from the analog telephone 3 in the message area 93 of the upstream packet 8, and composes the upstream packet 8 to which the telephone identifier 92 indicating that the transmission origin is the analog telephone 3 is attached. The microprocessor 25 transmits the upstream packet 8 to the PBX 1 via the upstream D-channel of the 2-wire digital line 4 (response information (packet)). At the same time, the microprocessor 25 stops the above described ringing signal transmission control.

The PBX 1 receives the response information by this packet, and performs a processing in which the upstream and downstream B2-channel of the 2-wire digital line 4 are exchangeably connected to the calling line connected to the PBX 1 by a general exchange processing. Thus, the talking path is established between the calling subscriber and the called person. Any of the downstream and upstream talking signals between the called person and the calling subscriber passes through the same talking path as that of the originating connection from the analog telephone 3, and then are transmitted between the analog telephone 3 and the PBX 1 (talking signal (PCM), talking signal (analog)).

Figure 8:
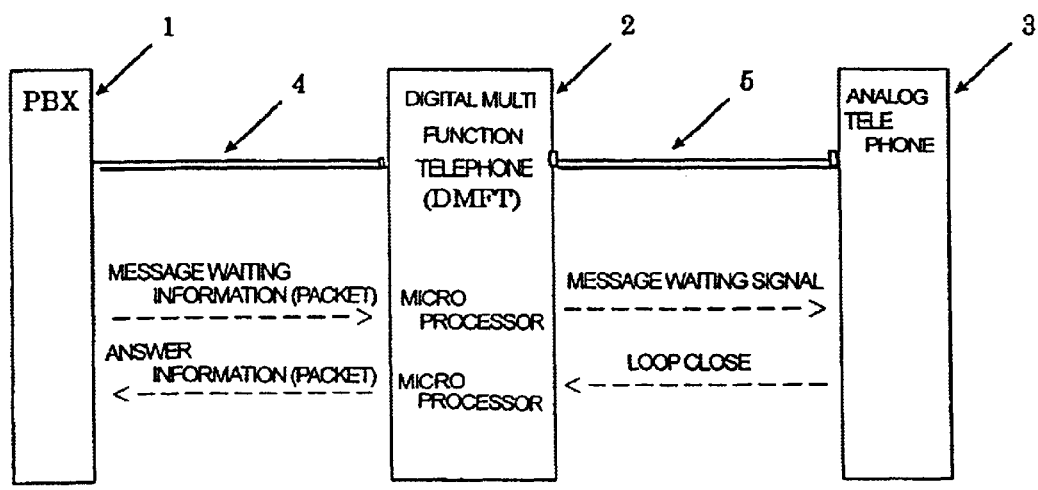
FIG. 8 is an explanatory view for explaining an operation to flash a message-waiting lamp of the analog telephone from a PBX side.

An explanatory view for explaining an operation to flash the message waiting lamp of the analog telephone from the PBX side is shown in FIG. 8.

Upon receipt of an instruction to flash the message waiting lamp of the analog telephone 3 from an input/output apparatus (not shown) and other telephones (not shown), the PBX 1 stores the message waiting signal information in the message area 93 of the downstream packet 7, and composes the downstream packet 7 to which the telephone identifier 92 indicating that contents of the downstream packet 7 are addressed to the analog telephone 3 is attached, The PBX 1 transmits the downstream packet 7 to the digital multi-function telephone 2 via the downstream D-channel of the 2-wire digital line 4 (message waiting information (packet)).

The downstream packet 7 loading the message waiting signal information to the analog telephone 3 is transferred to the microprocessor 25 after separating only a D-channel signal by the ping-pong transceiver LSI 23. The microprocessor 25 that recognized the transfer of the downstream packet 7 thereto controls the message waiting signal controlling relay 283 at a previously determined cycle via relay-driver in the SLIC LSI 282 so that the message waiting signal controlling relay 283 may turn on/off. By the first and second contacts 283a and 283b of the message waiting signal controlling relay 283, an input terminal of the DC-DC converter 285 for the message waiting signal is connected to the 2-wire digital line 4 via the choke coil 26, and an output terminal thereof is connected to the analog telephone 3 via the 2-wire analog line 5. Thus, the DC-DC converter 285 for the message waiting signal receives the current supply from the PBX 1 and operates only during the operation of the message waiting signal controlling relay 283. For example, the DC-DC converter 285 can send out an output voltage of 130 V to the analog telephone 3 via the 2-wire analog line 5 (message waiting signal). Since the message waiting lamp 33 in the analog telephone 3 is constituted so as to light up with a voltage of 130 V from the 2-wire analog line 5, it is possible to allow the message waiting lamp 33 to flash by the intermittent control of the microprocessor 25 at a previously determined cycle. Thus, it is possible to attract the attention of the user.

When the user raises the handset of the analog telephone 3, the loop open-close circuit 35 operates, and a loop-close signal is sent out to the 2-wire analog line 5. This signal is detected by the microprocessor 25 via the SLIC LSI 282, and it is recognized that the called person responded (loop close). The microprocessor 25 stores response information (loop close) from the analog telephone 3 in the message area 93 of the upstream packet 8, and composes the upstream packet 8 to which the telephone identifier 92 indicating that the transmission origin is the analog telephone 3 is attached. The microprocessor 25 transmits the upstream packet 8 to the PBX 1 via the upstream D-channel of the 2-wire digital line 4 (response information (packet)). At the same time, the microprocessor 25 stops the control to send out the foregoing message waiting signal. The PBX 1 receives the response information in the packet, and allows a status memory of the analog telephone 3 to transit from a message waiting signal sending-out state to a stop state, thus completing the processing.

Although the case where the two B-channels are employed was described as above, use of three or more B-channels makes also it possible to share a pair of twisted-paired cables by three or more telephones. In this case, the digital multi-function telephone 2 should separate/multiplex a plurality of B-channels by use of the ping-pong transceiver LSI 23 and should comprise a plurality of optional baby boards 28 corresponding to the respective B-channels. Then, each analog telephone 3 should be connected to the analog telephone connector 286 of corresponding one of the optional baby boards 28.

Next, a second embodiment of the present invention will be described.

The second embodiment is different from the first embodiment only in a method to transmit the telephone number of the called person from the analog telephone 3 to the PBX 1. A portion of the second embodiment different from the first embodiment, that is, an operation to a method to transmit the telephone number of the called person from the analog telephone 3 to the PBX 1 will be described with reference to FIGS. 1, 2 and 3 used for the description of the first embodiment. To be specific, in FIG. 2, in the analog telephone 3, provided is the loop open-close circuit 35 as a circuit which generates dial pulses in response to the loop close/open of the 2-wire analog line 5 and sends out a selection signal. Note that the DTMF oscillator 34 may be provided according to demand.

Figure 9:
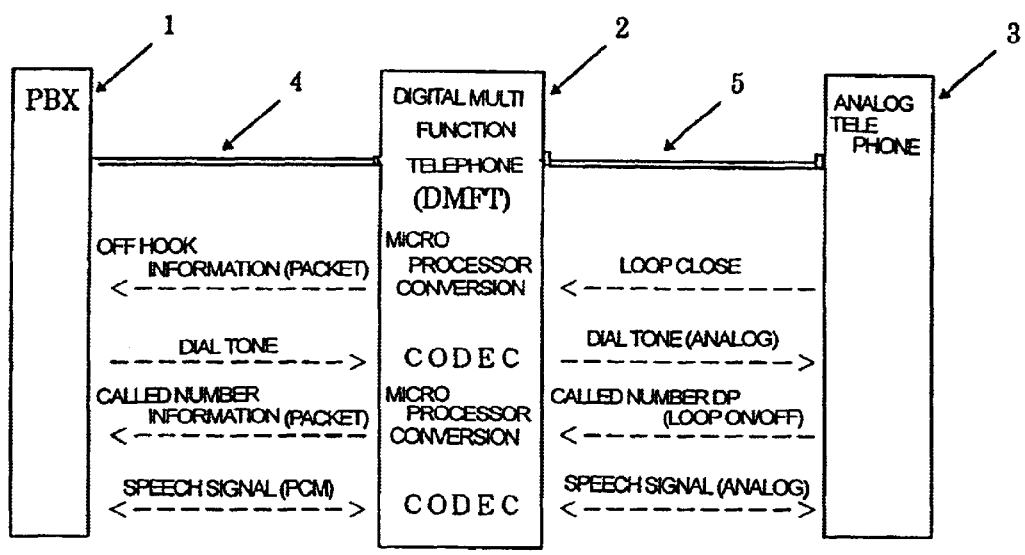
FIG. 9 is an explanatory view for explaining a signal transmission operation to the analog telephone.

An explanatory view for explaining a signal transmission operation from the analog telephone is shown in FIG. 9.

The user raises the handset of the analog telephone 3, and listens to dial tone sent according to the foregoing processing operation. Thereafter, the user dials the telephone number of the called person. The loop open-close circuit 35 sends out the loop open-close signal (selection signal) to the 2-wire analog line 5 in response to the dialed number (called telephone number DP (dial pulse) (loop open-close)). This loop open-close signal is detected by the microprocessor 25 via the SLIC LSI 282, and recognized as the telephone number of the called person transmitted from the analog telephone 3. The microprocessor 25 stores the called person telephone number information from the analog telephone 3 in the message area 93 of the upstream packet 8, and composes the upstream packet 8 to which the telephone identifier 92 indicating that the transmission origin is the analog telephone 3 is attached. The microprocessor 25 transmits the upstream packet 8 to the PBX 1 via the upstream D-channel of the 2-wire digital, line 4 (called person telephone number information (packet)). The PBX 1 receives the called person telephone number information in the packet 8, and recognized it. Then, the PBX 1 can perform the connection of the user and the called person by a general exchange processing (talking signal (PCM), talking signal (analog)).

Next, a third embodiment of the present invention will be described.

Figure 10:
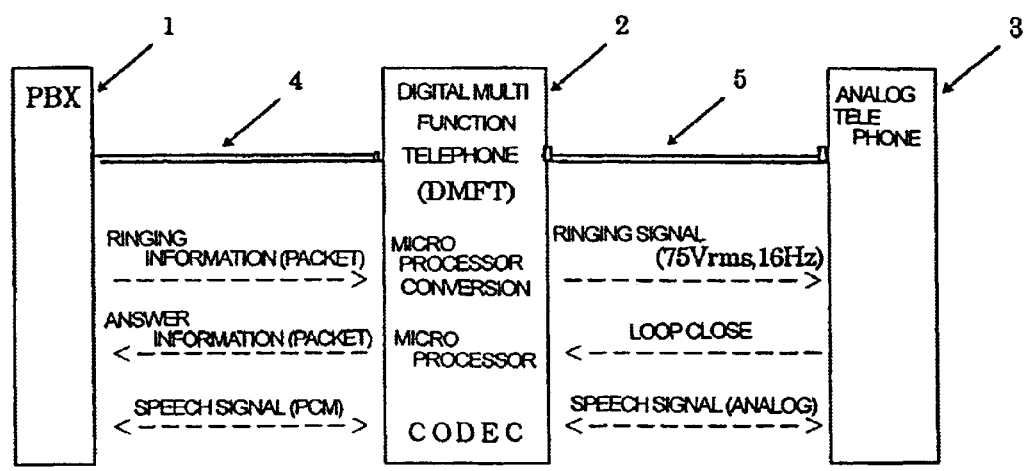
FIG. 10 is a diagram showing a constitution of a third embodiment of a digital multi-function telephone and an analog telephone of the present invention.

FIG. 10 is a diagram showing a constitution of the third embodiment of the digital multi-function telephone and the analog telephone of the present invention. The third embodiment is different from the first and second embodiments only in a method to transmit the ringing signal from the digital multi-function telephone 2 to the analog telephone 3, and the third embodiment will be described with reference to FIG. 10 and FIGS. 1 and 3 used for describing the first and second embodiments. A portion of the third embodiment different from the first and second embodiments that is, only an operation to a method to transmit the ringing signal from the digital multi-function telephone 2 to the analog telephone 113 will be described below.

The digital multi-function telephone 2 shown in FIG. 10 differs from the digital multi-function telephone 2 of the first and second embodiments in that the digital multi-function telephone 2 of FIG. 10 comprises a circuit for generating and transmitting a ringing signal (for example, 75 Vrms and 16 Hz) used for a general telephone interface in its optional baby board 110. The ringing signal controlling relay (RG relay) 111 for controlling the ringing signal to be transmitted to the analog telephone 3, the contact 111a of the ringing signal control relay 111 and the ringing power source 112 for generating the ringing signal are provided in the optional baby board 110. The ringer tone generating circuit 32 which operates upon reception and detection of the ringing signal is provided in the analog telephone 3. In the ringer tone generating circuit 32, the diode 32a is not provided unlike FIG. 2, which is connected to the ringer tone generating circuit 32 so as to allow current to pass therethrough when a polarity of the DC power source is inverted.

Figure 11:
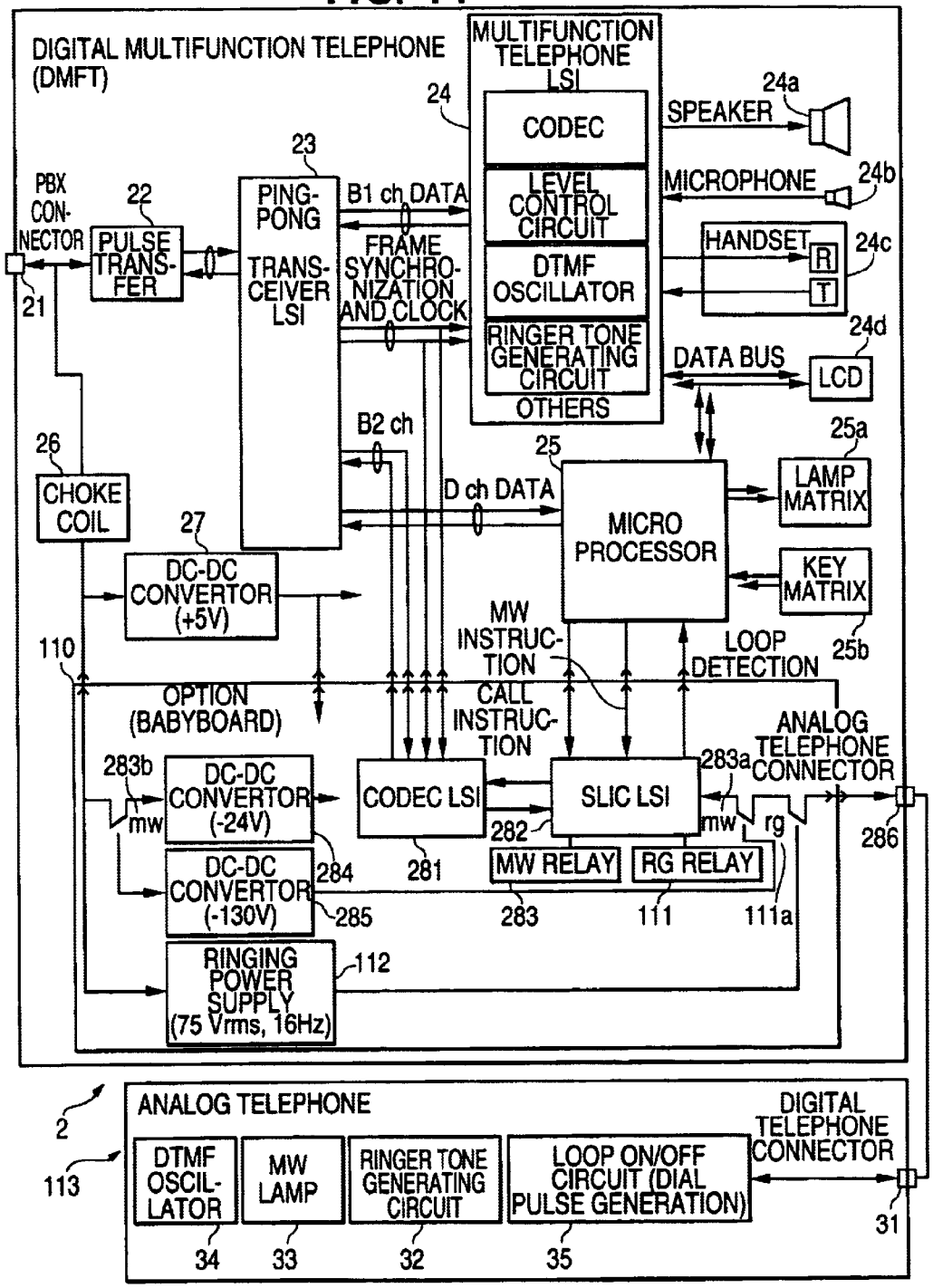
FIG. 11 is an explanatory view for explaining a signal receiving operation to the analog telephone.

An explanatory, view for explaining a signal receiving operation to the analog telephone is shown in FIG. 11.

When the microprocessor 25 receives from the PBX 1 the downstream packet 7 loading the ringing signal information to be transmitted to the analog telephone 3 (ringing information (packet)), the microprocessor 25 controls the ringing signal controlling relay 111 via a relay driver in the SLIC LSI 282 provided in the optional baby board 110 so that the ringing signal controlling relay 111 turns on/off at a previously determined cycle. Then, the output terminal of the ringing power source 112 is intermittently connected to the analog telephone 3 via the 2-wire analog line 5 by the contact 111a of the ringing signal controlling relay 111 (ringing signal (75 Vrms, 16 Hz). Thus, the ringer tone circuit 32 in the analog telephone 3 detects the ringing signal, and generates ringer tone. As a result, the user can be called up (talking signal (PCM), talking signal (analog)). Operations to be performed subsequently are as above.

Next, a fourth embodiment of the present invention will be described.

Figure 12:
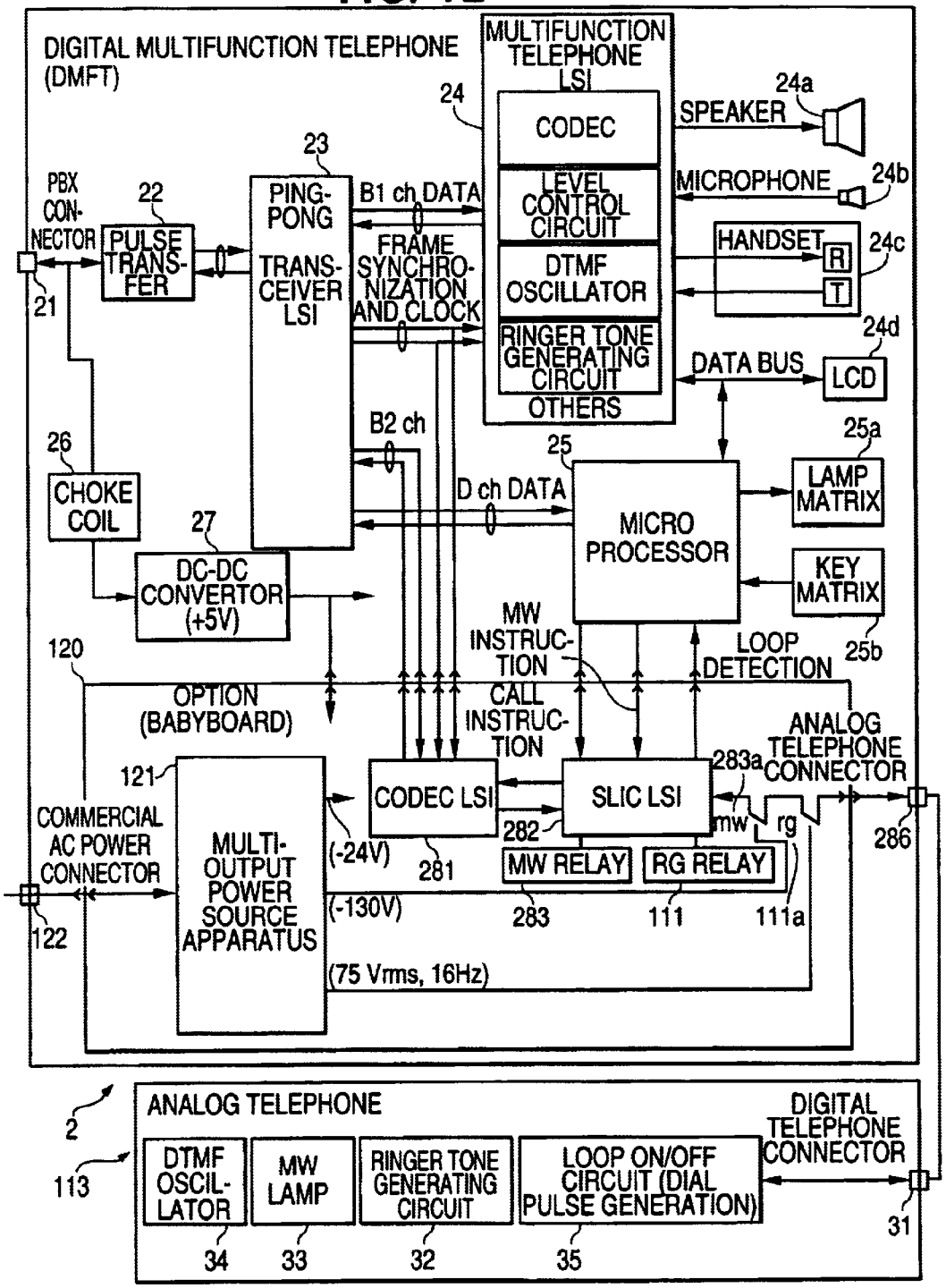
FIG. 12 is a diagram showing a constitution of a fourth embodiment of a digital multi-function telephone and an analog telephone of the present invention.

FIG. 12 shows a diagram showing a constitution of the fourth embodiment of the digital multi-function telephone and the analog telephone of the present invention. The fourth embodiment is different from the first to third embodiments only in a power source necessary for a power supply to the analog telephone 3, a ringing signal and a message-waiting signal. Only a portion of the fourth embodiment different from the first to third embodiments will be described with reference to FIG. 12 below. Note that the fourth embodiment can be combined with the first to third embodiments properly.

The optional baby board 120 in the digital multi-function telephone 2 comprises a connector 122 for connecting a commercial AC power source thereto and a multi-output power source apparatus 121 which includes a power source for receiving the commercial AC power source and superposing an AC power on a signal on the 2-wire analog line 5, thus supplying the AC power to the analog telephone 3, a message waiting signal power source, and a ringing signal power source.

The multi-output power source apparatus 121 of FIG. 12 outputs −24 V as the power source for supplying to the analog telephone 3 the power supposed on the signal on the 2-wire analog line 5, −130 V as the message waiting signal power source, and 75 Vrm, 16 Hz as the ringing signal power source, respectively. In the fourth embodiment, the three kinds of power sources described above are included in one power source apparatus as a whole. However, a part of them may be prepared by a commercial AC power source, and other power sources may be prepared by the DC-DC converter or the DC-AC converter from a power source which is superposed on a signal on the 2-wire digital line 4 and supplied to the digital multi-function telephone 2 from the PBX 1 as described in FIGS. 2 and 10.

Next, a fifth embodiment of the present invention will be described.

Figure 13:
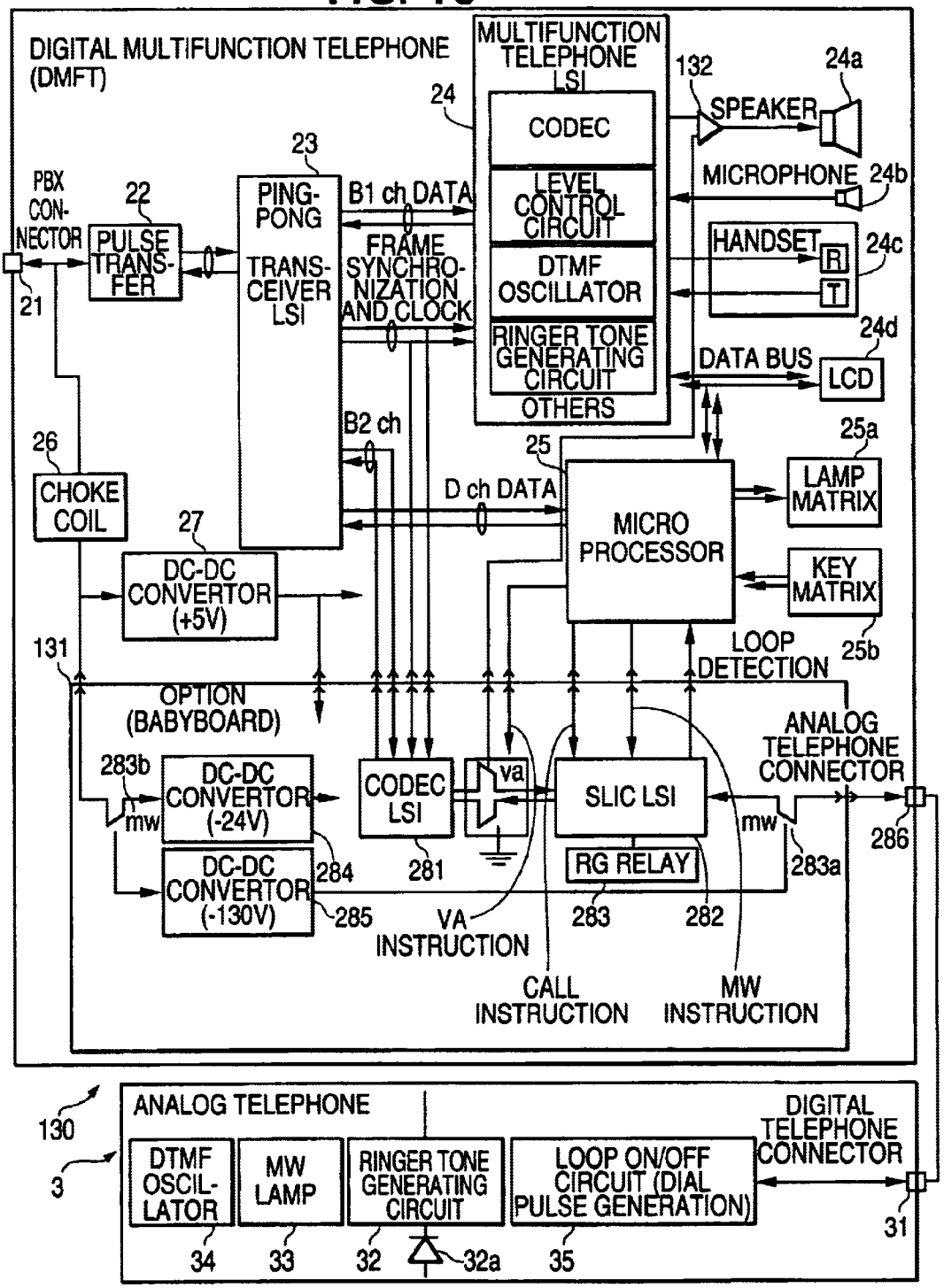
FIG. 13 is a diagram showing a constitution of a fifth embodiment of a digital multi-function telephone and an analog telephone of the present invention.

FIG. 13 shows a diagram showing a constitution of the fifth embodiment of the digital multi-function telephone and the analog telephone of the present invention.

As shown in FIG. 13, the digital multi-function telephone 130 having a voice announce function comprises the optional baby board 131, the analog adder 132 provided in a portion where the speaker 24a is driven, and the analog switch 133 for switching a B2-channel analog input/output signal allocated to the analog telephone 3. The fifth embodiment differs from the first to fourth embodiments in that a voice announce function is added, which outputs an announce from the speaker 24a provided in the digital multi-function telephone 130 without interrupting a talking of the user of the telephone 130 while he is talking by use of the hand set 24c. Note that the fifth embodiment can be combined with the first to fourth embodiments appropriately.

When the PBX 1 receives a voice announce sending-out instruction from a terminal and the like (not shown) to be transmitted to the digital multi-function telephone 130, the PBX 1 connects the terminal or an apparatus, which serve as a voice source of the voice announce, to the B2-channel, and further stores voice announce sending-out instruction information in the message area 93 of the downstream packet 7. The PBX 1 composes the downstream packet 7 to which the telephone identifier 92 indicating that contents of the downstream packet 7 are addressed to the digital multi-function telephone 130 is attached, and transmits the downstream packet 7 to the digital multi-function telephone 130 via the downstream D-channel of the 2-wire digital line 4.

The downstream packet 7 loading the voice announce sending-out instruction information to the digital multi-function telephone 130 is transferred to the microprocessor 25 after separating only a signal of the downstream D-channel by the ping-pong transceiver LSI 23. The microprocessor 25 which recognized the transfer of the downstream packet. 7 thereto controls the analog switch 133 (VA instruction). The microprocessor 25 switches the output terminal of the CODEC LSI 281 to the analog adder 132, and switches the input terminal thereof to the ground. When the user of the digital multi-function telephone 130 is talking by use of the B1-channel, an input signal from the multi-function telephone LSI 24 to the analog adder 132 does not exist. Accordingly, only an input signal from the CODEC LSI 281 is transferred to the speaker 24a. By grounding the input terminal of the CODEC LSI 281, it is possible to prevent the output of unnecessary sound to the terminal serving as the voice source of the voice announce even when an unnecessary signal is input from the analog telephone 3.

A one-directional talking path is established from the terminal or the apparatus, which serves as the voice source of the voice announce, to the speaker 24a of the digital multi-function telephone 130 via the 2-wire digital line 4, the PBX connector 21, the pulse transformer 22, the ping-pong transceiver LSI 23, the CODEC LSI 281, the analog switch 133 and the analog adder 132, and another announce can be put on the air from the speaker 24a even when the user of the digital multi-function telephone 130 is talking. Also when the user of the digital multi-function telephone 130 is not talking by use of the B1-channel, announce may be put on the air from the speaker 24a via the B2-channel.

Advantages of the Invention

According to the present invention, it is possible to economically provide the telephone circuit which is capable of setting up two simultaneously available telephones on a remote end or an end portion of a cable by use of a pair of existing twisted-paired cables.

According to the present invention, it is possible to provide the telephone circuit which makes it possible to set up two simultaneously available telephones on a remote end or an end portion of a cable, and especially to set up economically a plurality of telephones in a guest room, by use of a pair of existing twisted-paired cables connected to a telephone exchange, without any additional construction of a cable.

Moreover, according to the present invention, it is possible to economically realize a telephone circuit in which a ringing signal can be transmitted by a polarity-reversal signal between the first and second telephones, the necessity to provide the AC high voltage generating circuit that has been necessary can be removed, and a plurality of simultaneously available telephones can be set up on a remote end or end portion of a cable.

Although the preferred embodiments of the present invention have been described in detail, it should be understood that various changes, substitutions and alternations can be made therein without departing from spirit and scope of the invention as defined by the appended claims.

What is claimed is:

1. A telephone circuit comprising:

a first circuit connected to a telephone exchange by a pair of lines, the first circuit establishing first and second information channels and a signal channel bidirectionally between a telephone exchange and a first telephone, thus sending and receiving user information and a control signal therebetween; and a second circuit connected to a second telephone by a pair of lines, which sends and receives an analog signal of a voice band and a DC or AC control signal, and sends and receives the second information channel and a control signal between the first and second circuits, wherein the first circuit, among the bidirectional channels between the telephone exchange and the first telephone, allocates the first information channel to the first telephone, allocates the second information channel to the second telephone, and allocates a signal channel to the control signals of the first and second telephones.

2. The telephone circuit according to claim 1, wherein said second circuit receives an on-hook/off-hook signal and a dial signal from the second telephone by a loop open-close signal on a pair of lines, and said first circuit converts the loop open-close signal received from the second telephone to a control signal of a signal channel, and transmits to the control signal to the telephone exchange.

3. The telephone circuit according to claim 1, wherein said second circuit converts a multi-frequency signal as an address signal received from the second telephone to a digital signal, and transmits the digital signal to said first circuit, and said first circuit transmits the digital signal, which is received from the second circuit, to the telephone exchange via the second information channel.

4. The telephone circuit according to claim 1, wherein said second circuit converts a power source to an AC signal and transmits the AC signal to the second telephone based on transmission request information for sending out a ringing signal to the second telephone, the ringing signal being received from the telephone exchange via the signal channel.

5. The telephone circuit according to claim 1, wherein said second circuit applies a power supply polarity-reversal signal for the second telephone to a pair of lines between the second telephone and the second circuit based on a transmission request signal to the second telephone received from the telephone exchange via the signal channel, and thus the second telephone generates ring back tone in response to the polarity-reversal signal.

6. The telephone circuit according to claim 1, wherein a circuit for allowing said second telephone to generate ring back tone in response to the polarity-reversal signal is constituted so that current flows through a ring back tone generating circuit in response to an inversion of a power supply polarity by a diode characteristic.

7. The telephone circuit according to claim 1, wherein said second circuit converts a power source to a message waiting signal and sends out the message-waiting signal to the second telephone, based on transmission request information for sending out the message-waiting signal to the second telephone received from the telephone exchange via the signal channel.

8. The telephone circuit according to claim 1, wherein said second circuit includes an alternation switch for switching a downstream signal on second information channel to a speaker in the first telephone, based on transmission request information to the speaker received in the first telephone from the telephone exchange via the signal channel.

9. The telephone circuit according to claim 1, wherein said first circuit packetizes a signal, which is sent and received by the signal channel between the telephone exchange and the first circuit, and prepares a packet loading information sent and received as to the first telephone and a packet loading information sent and received as to the second telephone, separately, and identifies the first and second telephones by a telephone identifier provided inside the packet.

10. The telephone circuit according to claim 1, wherein the first telephone operates by a supply of a power from the telephone exchange, the power being superposed on a signal on a pair of lines, and the second telephone operates by a supply of a power from the first telephone, the power being superposed on a signal on a pair of lines.

11. The telephone circuit according to claim 1, wherein a power source for supplying a power from the first telephone to the second telephone by superposing it on a signal on a pair of lines, a message waiting signal power source, a ringing power source, all of the three sources or a part of them is supplied with either a power source supplied with a power from the telephone exchange to the first telephone, the power being superposed on a signal on a pair of lines, or an external power source.

* * * * *